United States Patent
Perkins, Jr.

(10) Patent No.: US 6,848,872 B2
(45) Date of Patent: Feb. 1, 2005

(54) LOAD STRAP WINDING DEVICE

(76) Inventor: Thelton Ray Perkins, Jr., R.R. 3, Box 178 (CR 379), El Campo, TX (US) 77437

( * ) Notice: Subject to any disclaimer, the term of this patent is extended or adjusted under 35 U.S.C. 154(b) by 0 days.

(21) Appl. No.: 10/379,630

(22) Filed: Mar. 5, 2003

(65) Prior Publication Data

US 2004/0175248 A1 Sep. 9, 2004

(51) Int. Cl.[7] ................................................. B60P 7/08
(52) U.S. Cl. ....................... 410/103; 410/100; 16/114.1; 74/544
(58) Field of Search ................................ 410/100, 103, 410/156; 16/114.1; 7/168; 74/544, 545, 548; 81/177.2, 177.7, 489, 73, 35

(56) References Cited

U.S. PATENT DOCUMENTS

| | | | | |
|---|---|---|---|---|
| 1,500,069 A | * | 7/1924 | Gould | |
| 5,433,565 A | * | 7/1995 | Chan | 410/103 |
| 5,791,844 A | * | 8/1998 | Anderson | 410/103 |
| 5,833,217 A | * | 11/1998 | Goldsby | |
| 6,056,488 A | * | 5/2000 | Depoy | 410/100 |
| 6,102,637 A | | 8/2000 | Mocci | 410/103 |
| 6,139,233 A | * | 10/2000 | Wilsey | 410/100 |
| 6,179,534 B1 | * | 1/2001 | Weckter | 410/103 |
| 6,200,079 B1 | * | 3/2001 | Little | 410/103 |
| 6,398,470 B1 | | 6/2002 | Mosley | 410/100 |
| 6,659,697 B1 | * | 12/2003 | Guenther | 410/103 |

* cited by examiner

*Primary Examiner*—Stephen Gordon

(57) ABSTRACT

A device for quickly winding strap around a spool of a ratcheting binder assembly having a longitudinal axis includes a leverage hole engaging mechanism, a longitudinal axis generally coincident with the longitudinal axis of the spool, and two generally freely rotatable handles offset from the longitudinal axis spaced 180 degrees apart. An alternate embodiment includes an extended tail end portion adapted to rest within an adjacent ratcheting binder and may include another leverage hole engaging mechanism to turn two adjacent spools coincidently.

6 Claims, 2 Drawing Sheets

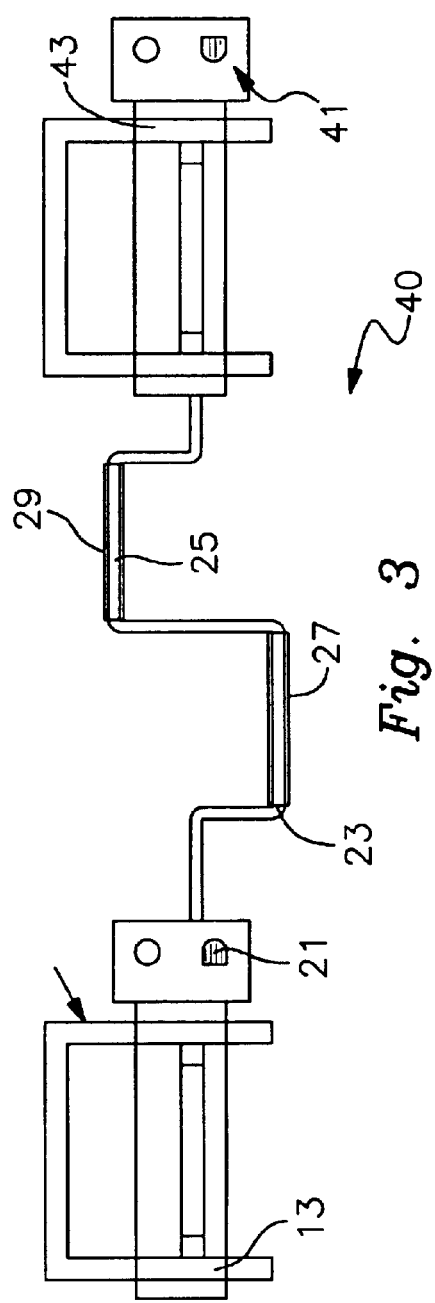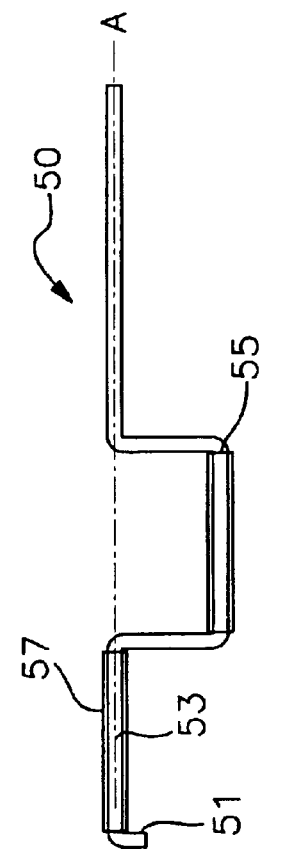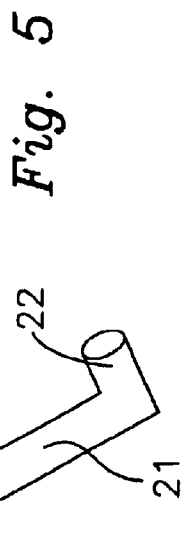

LOAD STRAP WINDING DEVICE

BACKGROUND OF THE INVENTION

The invention relates generally to the field of load straps used on flat bed trucks, and in particular to a device for quickly winding strap around the spool of a ratcheting binder assembly.

Securing a truckload of flatbed freight has evolved over the years into what is now a convenient way of accomplishing this task while protecting the freight from damage by the securing mechanism itself. Load straps are typically nylon fibers woven together to provide a lengthy, strong and broad band of convenient lightweight material. Ratcheting binders mounted on the side of the trailer, some in sliding tracks, further simplify and extend the versatility of these straps by enabling the operator to locate the strap where it is most needed on diverse freight loads and to easily tighten the strap to a desired tension to ensure safe transport. Many ratcheting binders are designed to allow the operator to spool the strap on the binder's spool for storage when it is not in use securing a load.

Currently, rewrapping straps to their stored position about the spool of a ratcheting binder assembly is to wind the strap by hand on to the binder spool. In the case of a load of freight that requires ten or more straps, this can be an arduous task for the operator.

BRIEF SUMMARY OF THE INVENTION

One advantage of the invention is to provide an improved way of quickly winding strap about a spool in a ratcheting binder assembly as used in the flatbed trucking industry.

Another advantage of the invention is to allow increased stability in the device while quickly winding strap about the spool.

In accordance with a preferred embodiment of the present invention, a device for quickly winding strap around a spool of a ratcheting binder assembly having a longitudinal axis comprises a leverage hole engaging mechanism, a longitudinal axis generally coincident with the longitudinal axis of the spool, and one or more handles, at least one of which is offset from the longitudinal axis.

Other objects and advantages will become apparent from the following descriptions, taken in connection with the accompanying drawings, wherein, by way of illustration and example, an embodiment of the present invention is disclosed.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 3 is a cross-sectional perspective view of the winding device in accordance with an alternate view of the present invention.

FIG. 4 is a cross-sectional perspective view of the winding device in accordance with an alternate embodiment of the present invention.

FIG. 5 is an expanded, angled view of the ratchet engagement in accordance with a preferred embodiment of the present invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
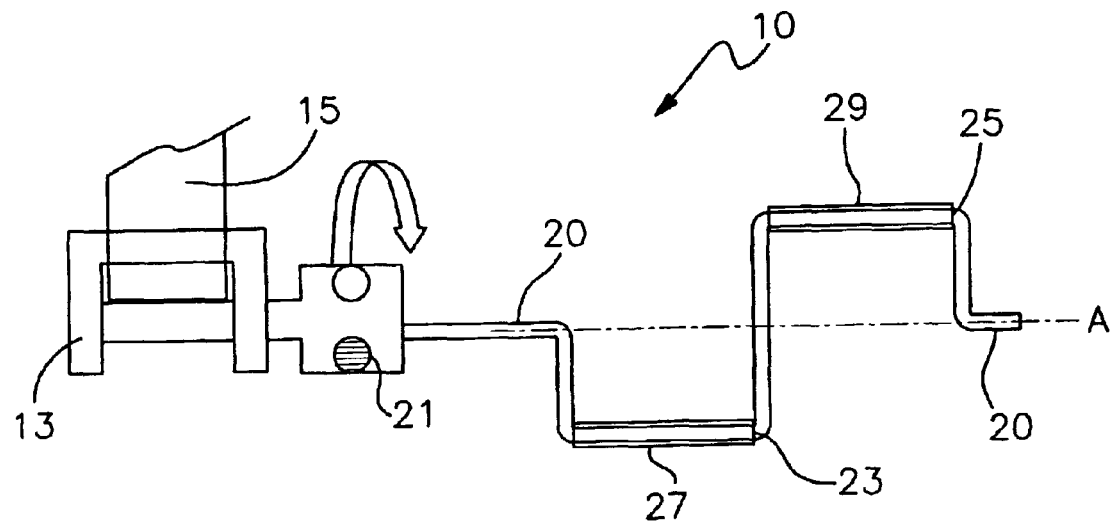
FIG. 1 is a cross-sectional perspective view of the winding device in accordance with a preferred embodiment of the present invention inserted in a leverage hole of a ratcheting binder assembly.

Turning now to FIG. 1, there is shown in more detail a winding device 10 in accordance with a preferred embodiment of the present invention. Winding device 10 has a longitudinal axis A that is coincident with the longitudinal axis of a spool 13 upon which is wound binding strap 15. Winding device 10 includes a ratchet engagement 21 designed to engage with an aperture or leverage hole of spool 13, of which there are four on typical spools in use. Further two handles 23, 25 are provided and offset from longitudinal axis A by a set distance. In the preferred embodiment, the offset is approximately four inches so as to have adequate clearance between the handles and operator handles and the flat bed truck. In the illustrated embodiment, each handle 23, 25 is offset 180° about axis A from each other in a crank fashion so as to increase operator efficiency. In addition, each handle 23, 25 includes a sheath 27, 29, respectively, rotatable about the winding device main shaft 20. Rotatable sheaths 27, 29 allow for the operator to grip at handle portions 23, 25 and not have friction at the operator's hand, allowing for increased speed and ease of use.

In operation, winding device 10 is used by inserting ratchet engagement 21 in spool 13 aperture. Thereafter, the user grabs handles 23, 25 by sheaths 27, 29, one in each hand, successively pulls one handle while pulling the other end then vice versa, much the same as feet move pedals of a bicycle. In this way, ratchet engagement 21 is moved in a circular fashion and thereby rotates spool 13. Since strap 15 is engaged on spool 13, strap 15 is quickly and easily wound about spool 13.

Winding device 10 may be made of a variety of materials such as metal, plastic, composites, etc., and may be rigid or semi-rigid. In addition, the transition portion between main shaft 20 and handles 23, 25 may be at a ninety degree angle, as shown, or may be of a degree something less than ninety, depending upon the particular design considerations of a situation. Further, it will be appreciated that sheaths 27, 29 may be installed around main shaft 20 before main shaft 20 is bent to form handles 23, 25, or sheaths 27, 29 may be attached afterwards.

Figure 2:
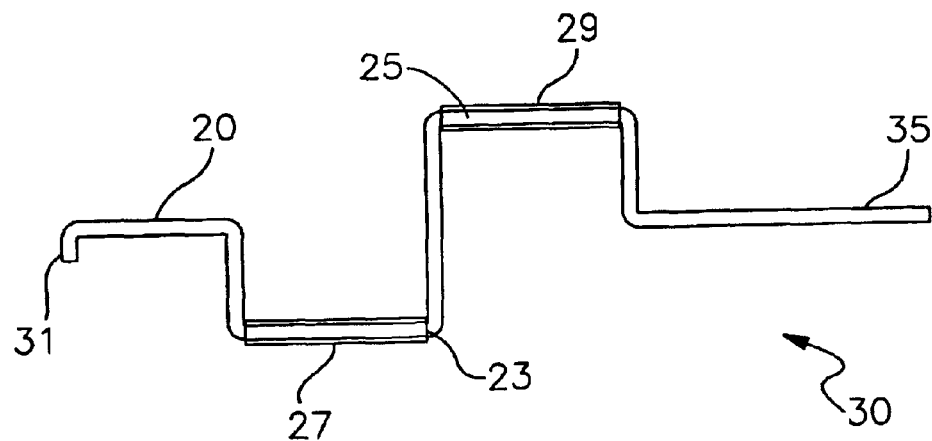
FIG. 2 is a cross-sectional perspective view of the winding device in accordance with an alternate embodiment of the present invention.

Turning now to FIG. 2 there is shown a cross-sectional perspective view of a winding device in accordance with an alternate preferred embodiment of the present invention. Winding device 30 is similar to winding device 10 shown in FIG. 1 and includes a extended tail portion 35. Extended tail portion 35 is of sufficient length to touch an adjacent spool when ratchet engagement 31 is engaged for winding a strap on a spool. In this manner, winding device 30 is supported without an operator required to support the weight of winding device 30 while winding strap about a spool, nor maintain winding device 30 in longitudinal alignment with the spool.

Turning now to FIG. 3 there is shown a perspective view of a winding device in accordance with an alternate preferred embodiment of the present invention. Winding device 40 is similar to winding device 30 shown in FIG. 2 and includes a second ratchet engagement 41 at the generally opposite end from first ratchet engagement 21. After ratchet engagement 41 and ratchet engagement 21 engage adjacent spools 13, 43, when rotated at handles 23, 25 through sheaths 27, 29, winding device 40 may simultaneously turn two spools, winding strap about each spool.

Turning now to FIG. 4 there is shown a perspective view of a winding device in accordance with an alternate preferred embodiment of the present invention. Winding device 50 is similar to winding device 20 of FIG. 2 but has first handle 53, and first handle sheath 57, along axis A without being offset spaced from axis A. In operation, the operator also holds handles 53, 55, one in each hand, but only rotates the hand holding handle 53, keeping handle 53 generally stationary. This arrangement of FIG. 4 may be employed in the configurations of FIG. 2 showing an extended tail portion, and of FIG. 3 showing a second ratchet engagement.

FIG. 5 shows an expanded, angled view of the ratchet engagement 21 in accordance with a preferred embodiment of the present invention. In the illustrated embodiment, ratchet engagement 21 includes a tip 22 approximately ¼ to ⅜ inch long at about a 90 degree angle from the tip of ratchet engagement 21 to help maintain contact between winding device 10 and ratcheting binder leverage hole of spool 13 during operation. A similar tip may be included on any of the embodiments discussed above.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device for quickly winding a strap around a spool having a longitudinal axis of a ratcheting binder assembly comprising:

a leverage hole engaging mechanism;

a longitudinal axis generally coincident with the longitudinal axis of the spool;

two handles, each handle being offset from the longitudinal axis of the binder assembly; and an extended tail end portion adapted to rest within an adjacent ratcheting binder assembly.

2. A device as claimed in claim 1 wherein the two handles are generally freely rotatable.

3. A device as claimed in claim 1 wherein the two handles are offset from each other by 180° along the longitudinal axis of the binder assembly.

4. A device as claimed in claim 1 wherein the device is made from a semi-rigid material.

5. A device as claimed in claim 1 further comprising:

a second leverage hole engaging mechanism at the tail end portion.

6. A device as claimed in claim 1 wherein the leverage hole engaging mechanism includes a tip angled approximately 90 degrees therefrom.

* * * * *